US011976406B2

(12) United States Patent
Urbanski et al.

(10) Patent No.: US 11,976,406 B2
(45) Date of Patent: May 7, 2024

(54) FLOATING INNER DOOR OF A COMBINATION WASHER/DRYER

(71) Applicant: Whirlpool Corporation, Benton Harbor, MI (US)

(72) Inventors: Logan R. Urbanski, St. Joseph, MI (US); Joel Sells, Watervliet, MI (US); Michael Vriezema, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 29 days.

(21) Appl. No.: 17/564,408

(22) Filed: Dec. 29, 2021

(65) Prior Publication Data

US 2023/0203741 A1 Jun. 29, 2023

(51) Int. Cl.

| | |
|---|---|
| ***D06F 39/14*** | (2006.01) |
| ***D06F 25/00*** | (2006.01) |
| ***D06F 37/22*** | (2006.01) |
| ***D06F 37/28*** | (2006.01) |
| ***E05C 3/16*** | (2006.01) |
| *E05B 47/00* | (2006.01) |

(52) U.S. Cl.

CPC .............. *D06F 39/14* (2013.01); *D06F 25/00* (2013.01); *D06F 37/22* (2013.01); *D06F 37/28* (2013.01); *E05C 3/16* (2013.01); *E05B 47/0001* (2013.01)

(58) Field of Classification Search

CPC .......... D06F 39/14; D06F 37/22; D06F 37/28; D06F 25/00; E05C 3/16; E05B 47/0001

USPC .............................................................. 68/20

See application file for complete search history.

(56) References Cited

U.S. PATENT DOCUMENTS

| | | | |
|---|---|---|---|
| 4,433,452 | A | 2/1984 | Frano |
| 7,269,981 | B2 | 9/2007 | Kwon |
| 7,427,086 | B2 | 9/2008 | Park et al. |
| 7,677,064 | B2 | 3/2010 | Kim et al. |
| 8,123,312 | B2 | 2/2012 | Jeon et al. |
| 8,448,482 | B2 | 5/2013 | Schuck et al. |
| 8,661,859 | B2 | 3/2014 | Choi |
| 8,844,328 | B2 | 9/2014 | Loss |
| 9,217,217 | B2 | 12/2015 | Kasack et al. |
| 9,273,425 | B2 | 3/2016 | Kim et al. |
| 9,590,372 | B2 | 3/2017 | Woo et al. |
| 9,617,677 | B2 | 4/2017 | Buso et al. |
| 9,752,272 | B2 | 9/2017 | Yeom et al. |

(Continued)

FOREIGN PATENT DOCUMENTS

| | | | |
|---|---|---|---|
| JP | 2003093789 A | * | 4/2003 |
| KR | 20160112648 A | | 9/2016 |

OTHER PUBLICATIONS

JP2003093789A—machine translation (Year: 2003).*

(Continued)

*Primary Examiner* — Tinsae B Ayalew

(74) *Attorney, Agent, or Firm* — Harness, Dickey & Pierce, PLC

(57) ABSTRACT

A combination washer/dryer (20) has a cabinet (12) with an opening enabling access inside the cabinet (12). A drum and tub assembly (14) is positioned within the cabinet (12). A washing circuit (40) washes items in the drum and tub assembly (14). A drying circuit (50) dries the items in the drum and tub assembly (14). A door assembly (16) includes an outer door (18) and a floating inner door (20) sealing the drum and tub assembly (14).

18 Claims, 12 Drawing Sheets

(56) References Cited

U.S. PATENT DOCUMENTS

| | | | |
|---|---|---|---|
| 9,797,083 | B2 | 10/2017 | Bao et al. |
| 9,890,495 | B2 | 2/2018 | Lee et al. |
| 9,951,458 | B2 | 4/2018 | Jo et al. |
| 9,957,656 | B2 | 5/2018 | Jo et al. |
| 9,995,067 | B2 | 6/2018 | Promutico |
| 10,060,070 | B2 | 8/2018 | Jo et al. |
| 10,100,457 | B2 | 10/2018 | Jo et al. |
| 10,316,449 | B2 | 6/2019 | Jo et al. |
| 2011/0120195 | A1 | 5/2011 | Jeoung et al. |
| 2020/0157728 | A1 | 5/2020 | Bodine et al. |
| 2021/0047770 | A1 | 2/2021 | Attar et al. |

OTHER PUBLICATIONS

KR20160112648A—machine translation (Year: 2016).*
European Search Report for EP Application No. 22204264.0-1016, dated May 31, 2023 (76 pages).

* cited by examiner

FLOATING INNER DOOR OF A COMBINATION WASHER/DRYER

FIELD

The present disclosure relates to a door assembly for an appliance such as a washer, washer/dryer combo and, more particularly, to a door assembly including an inner and outer door.

BACKGROUND

In existing washers and washer/dryer combo machines, there is a problem with accumulation of lint and detergent along the bellows seal. The bellows is a seal between the door and the movable tub and drum assembly. The bellows is subjected to lint and detergent and both accumulate on the bellows. Thus, the bellows has a tendency to wear out due to the accumulation. Also, in some types of commercial washers, the door is attached to the tub. Thus, the door moves with the suspended tub and drum assembly. This is not ideal for customers since the door will be moving with the suspended tub and drum assembly; however, it does eliminate the need for a bellows.

Accordingly, it is an object of the disclosure to provide a door assembly that eliminates the bellows seal between the door and the tub and drum assembly. The present disclosure provides a door assembly with an inner and outer door to enable elimination of the bellows seal. The door assembly may include a stationary or floating inner door meshing with a tub opening. The door assembly may include a door suspension assembly between the inner and outer doors. The door assembly may include an alignment and support member assisting in coupling the inner door with the cabinet in a closed position. The door assembly may also, include an active latch mechanism for pulling the inner door shut.

SUMMARY

According to a first object of the present disclosure, a combination washer/dryer comprises a cabinet with an opening enabling access inside the cabinet. A drum and tub assembly is positioned within the cabinet. A washing circuit for washing items in the drum and tub assembly is positioned within the cabinet. A drying circuit for drying the items in the drum and tub assembly is likewise positioned within the cabinet. A door assembly is also provided, which includes an outer door and a floating inner door that seals against the drum and tub assembly in a closed position. A door suspension assembly couples the inner and outer doors together. The door suspension assembly may include a pivot that enables the inner door to teeter with respect to the outer door. A hook on the inner door engages a hook receiver on the drum and tub assembly. Also, the door suspension assembly may include a plate mounted on the inner door and one or more spring coupled with the plate. Thus, the inner door and the plate can slide with respect to the outer door to enhance engagement of the hook with the hook receiver. The inner door may hang off center with respect to the outer door when the door assembly is open. The door suspension assembly may include a plurality of alignment pins coupled between the plate and the outer door to compensate for twisting forces placed on the inner door and to transfer the twisting forces to the plate. An alignment member is on the inner door to support the weight of the inner door and prohibit lateral and longitudinal forces from being applied to a door latch on the inner door. The hook receiver on the drum and tub assembly includes an aperture and one or more ramps adjacent the aperture to lead the hook on the inner door into the aperture to compensate for misalignment. A motion limiter prohibits undue motion when opening the outer door, while enabling motion of the inner door during a wash cycle. The latch on the inner door secures the inner door to an inner door catch on the drum and tub assembly. The latch may include an action configured to pull on the inner door catch to pull the inner door to a closed position. The door latch may include a handle with a hook that pulls on the inner door catch to seal the inner door against the drum and tub assembly. An alignment device may be coupled with the outer door to position the inner door to enhance coupling of the inner door with the cabinet. The alignment device includes a cam coupled with a linkage which, in turn, couples with a finger. The finger moves the inner door.

According to an additional object of the disclosure, a door assembly for an appliance, such as a washer, combination washer/dryer, or the like comprises a door assembly for a cabinet. The door assembly includes an outer door and a floating inner door that seals against a drum and tub assembly positioned inside of the cabinet. The inner door is floatably coupled with the outer door via a door suspension assembly. The door suspension assembly may include a pivot that enables the inner door to teeter with respect to the outer door. A hook on the inner door engages a hook receiver on the drum and tub assembly. Also, the door suspension assembly may include a plate mounted on the inner door and one or more spring coupled with the plate. Thus, the inner door and the plate can slides with respect to the outer door to enhance engagement of the hook with the hook receiver. The inner door may hang off center with respect to the outer door when the door assembly is open. The door suspension assembly may include a plurality of alignment pins coupled between the plate and the outer door to compensate for twisting forces placed on the inner door and transfer the twisting forces to the plate. An alignment member is on the inner door to support the weight of the inner door and prohibit lateral and longitudinal forces from being applied to a door latch on the inner door. The hook receiver on the drum and tub assembly includes an aperture and one or more ramps adjacent the aperture to lead the hook into the aperture to compensate for misalignment. A motion limiter prohibits undue motion when opening the outer door, while enabling motion of the inner door during a wash cycle. The door latch on the inner door secures the inner door to an inner door catch on the drum and tub assembly. The door latch may include an action that pulls on the inner door catch to pull the inner door to a closed position. The door latch may include a handle with a hook that pulls on the inner door catch to seal the inner door against the drum and tub assembly. An alignment device may be coupled with the outer door to position the inner door and enhance coupling of the inner door with the cabinet. The alignment device includes a cam coupled with a linkage which, in turn, couples with a finger. The finger moves the inner door.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
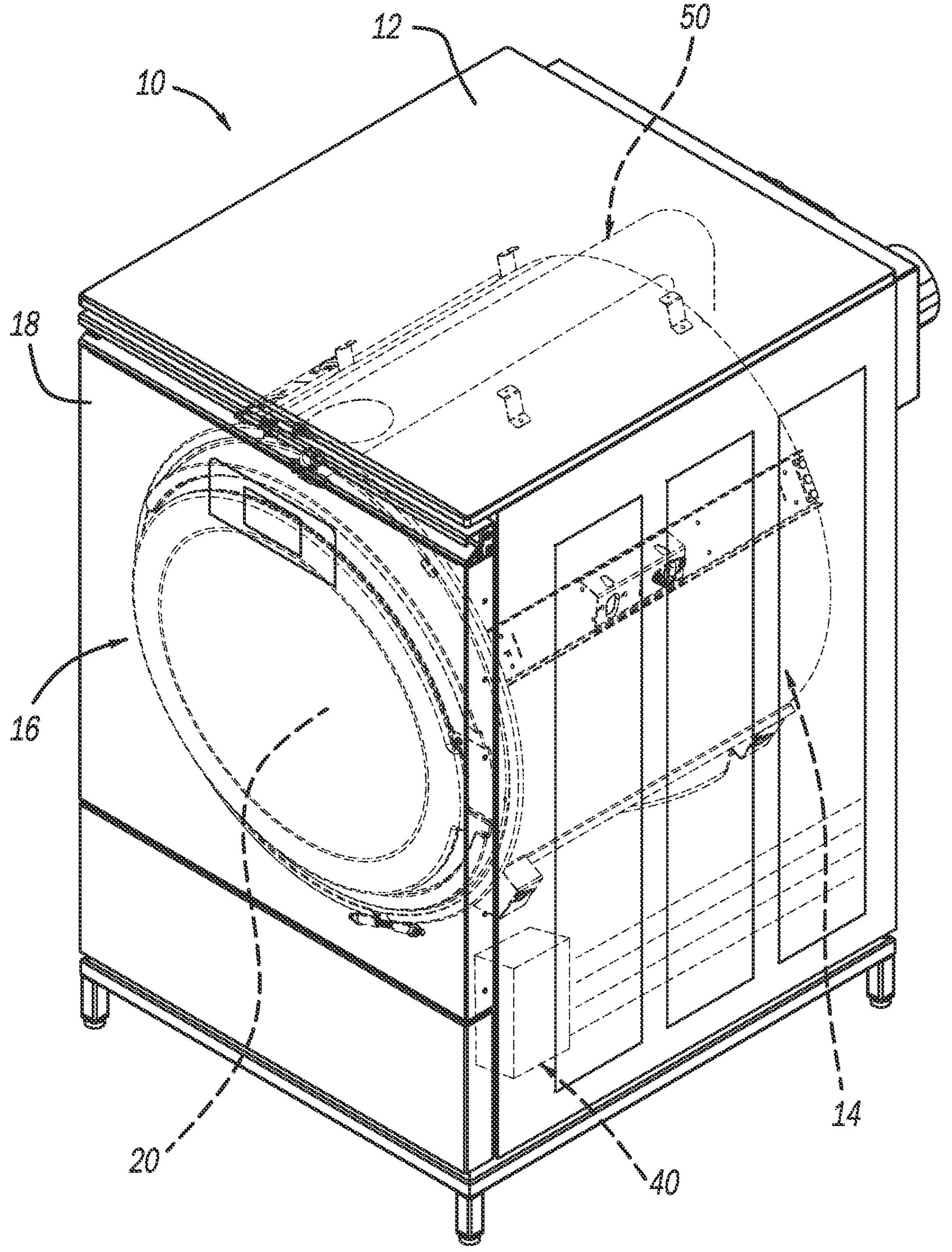
FIG. 1 is a perspective view of a washing appliance in accordance with the disclosure.
Figure 2:
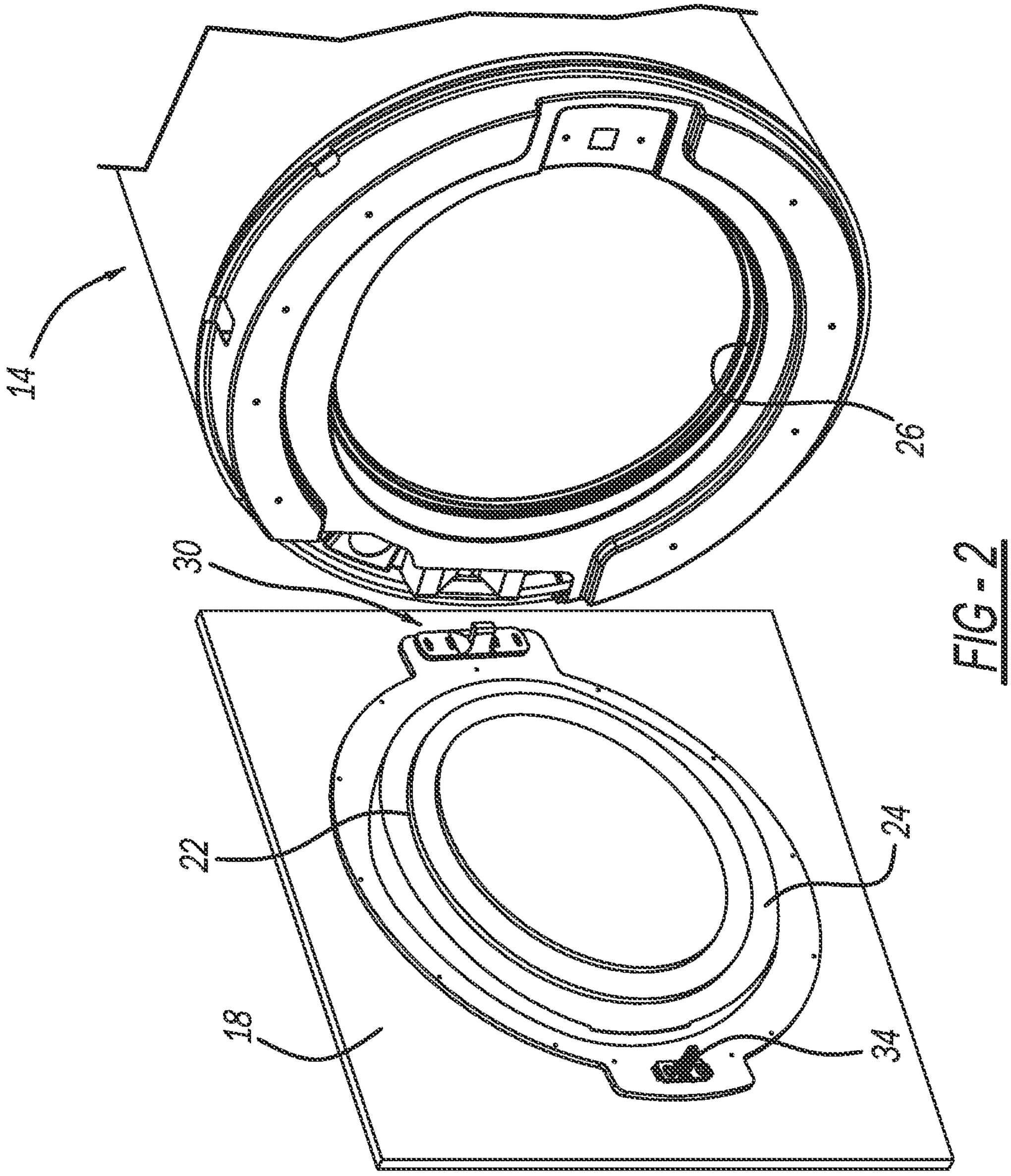
FIG. 2 is a perspective view with the door in an opened position.

FIG. 12A-D are schematic views of an alignment device in accordance with the present disclosure.

FIG. 13A-E are schematic views of an alignment device in accordance with the disclosure.

DETAILED DESCRIPTION

Example embodiments will now be described more fully with reference to the accompanying drawings.

Turning to the figures, a washing appliance, such as a washing machine or a combination washer/dryer is illustrated and designated with the reference numeral 10. The washing machine or combination washer/dryer 10 includes a cabinet 12 that houses a drum and tub assembly 14. A door assembly 16 covers a drum and assembly opening 26. The door assembly 16 includes an outer door 18 and an inner door 20. The outer door 18 is secured to the cabinet 12 via a hinge.

The inner door 20 includes a door latch 34 to enable locking of the inner door 20 with the cabinet 12 when the inner door 20 is closed. The inner door 20 includes a seal 22 that provides a thermal seal with drum and tub assembly 14. The inner door 20 has contours 24 with a step configuration in cross-section that enables mating with the drum and tub assembly opening 26. The contours 24 interact with the opening 26 to enable sealing of the inner door 20 in the opening 26, which eliminates the need for a bellows seal. The inner door 20 includes a hook mechanism 30 that secures the inner door 20 with the drum and tub assembly 14.

The washing appliance 10 includes a washing circuit 40 as is conventional in the art. Additionally, the machine 10 includes a drying circuit 50 with a blower, heater and the like as is described in Applicant's U.S. patent application Ser. No. 17/318,892, filed on May 12, 2021, entitled "Door For A Washing Appliance." Alternatively, a conventional drying circuit could be used.

Figure 3:
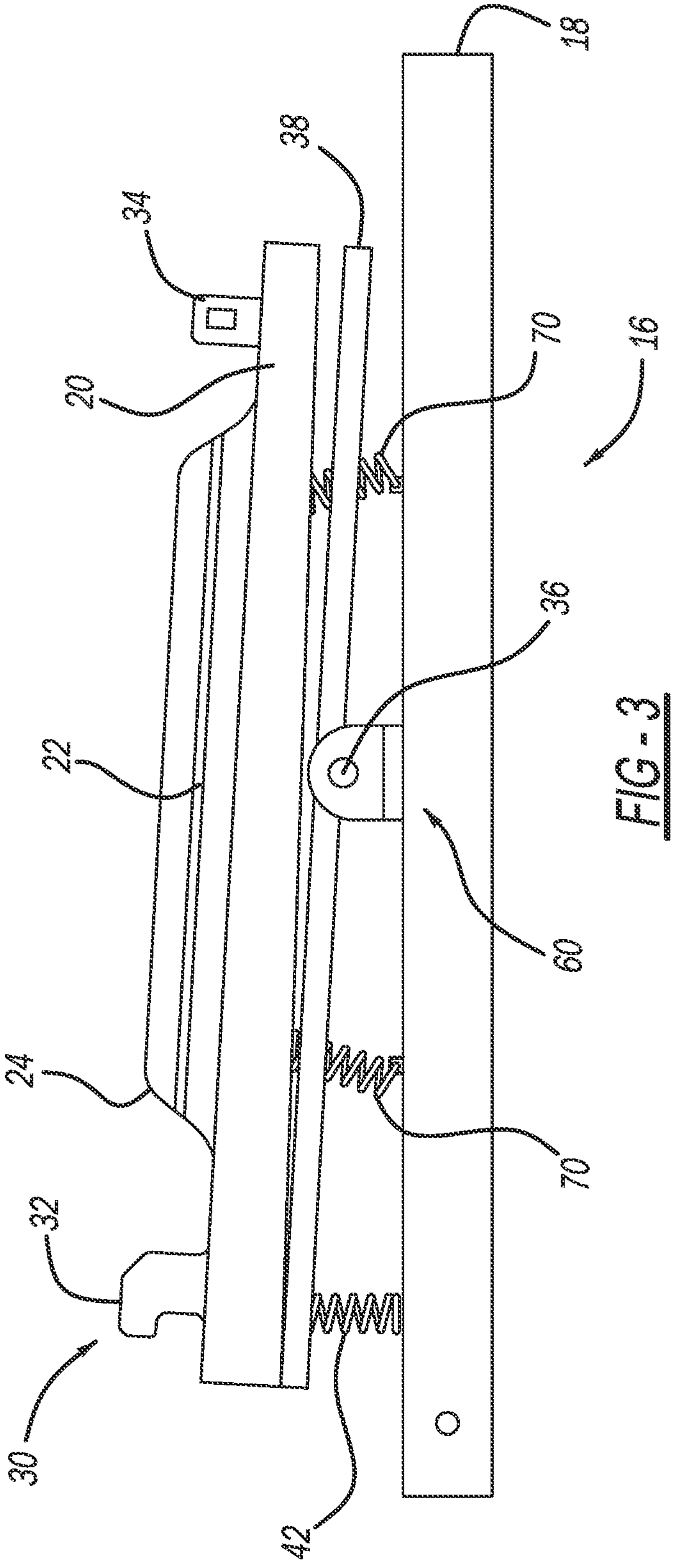
FIG. 3 is a top plan view of a door in accordance with the disclosure.

The door assembly 16 of FIG. 3 includes the outer door 18 and inner door 20. As can be seen, the hook mechanism 30 in the embodiment includes a hook 32 that acts to attach the inner door 20 to the drum and tub assembly 14. A door latch 34 extends from the inner door 20 to secure the other side of the inner door 20 with the drum and tub assembly 14.

As illustrated in FIG. 3, a door suspension assembly 60, including a pivot 36, may be positioned between the outer door 18 and the inner door 20. The pivot 36 includes a lever bar 38 that pushes against the inner door 20. The inner door 20 is free to slide along the lever bar 38 and is free to break contact with the lever bar 38. The lever bar 38 includes a biasing member 42, such as a compression spring, on one of its ends. Thus, the pivot 36 enables the lever bar 38 to teeter with respect to the outer door 18. When the outer door 18 is open and stationary, the lever bar 38 is suspended by the pivot 36, and the inner door 20 is suspended by springs 70 in FIG-4. The lever bar 38, via the biasing member or spring 42, pushes the side of the floating inner door 20 with the hook 32 further away from the face of the outer door 18. This biasing member 42 ensures that when the outer door 18 is closing, the hook 32 sticks out more and easily meshes with the hook receiver 120. Once this is accomplished, the lever bar 38 levels out and permits/facilitates the door latching between the drum and tub assembly 14 and the door latch 34.

Figure 4:
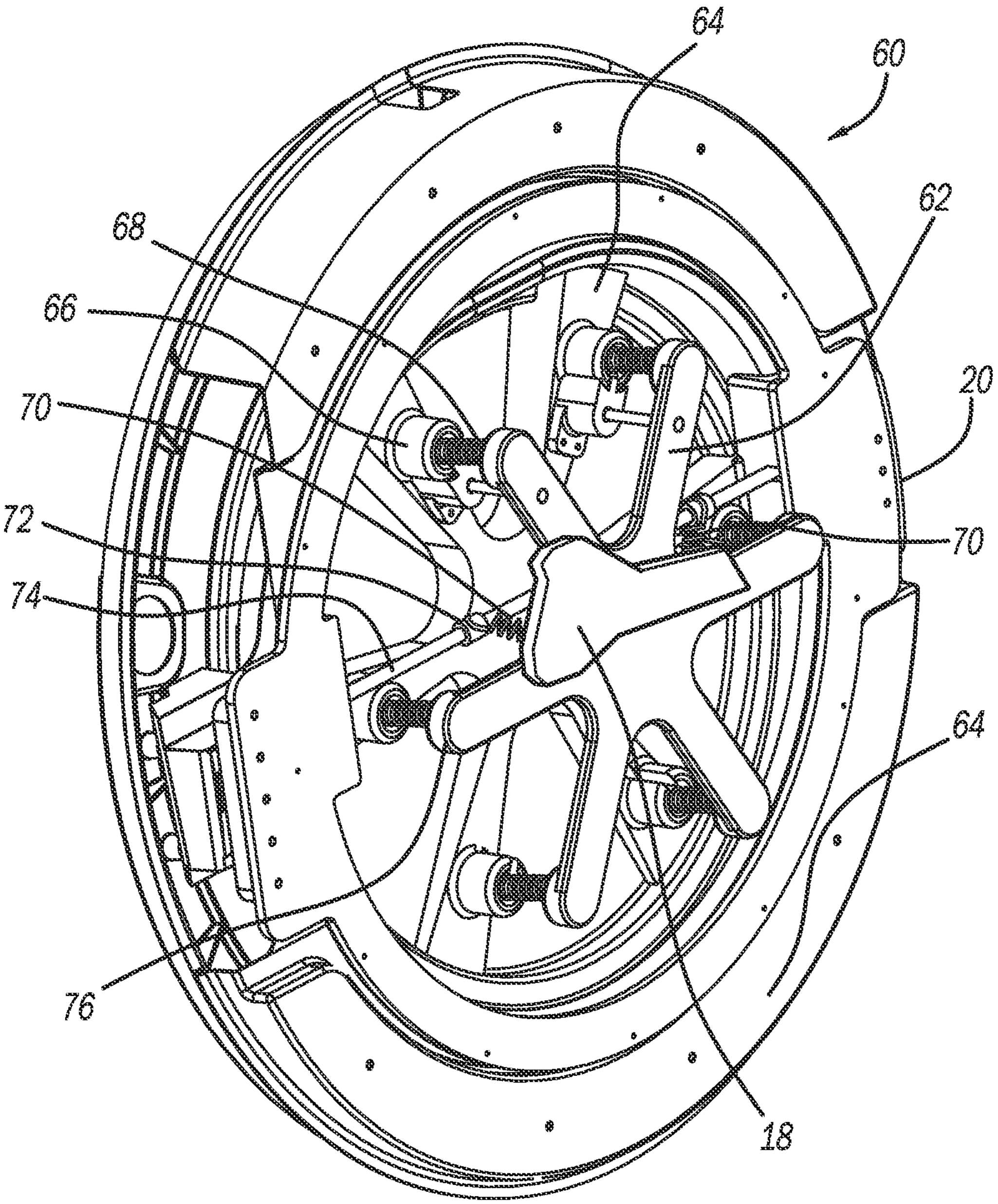
FIG. 4 is a perspective view of a door in accordance with the disclosure.
Figure 5:
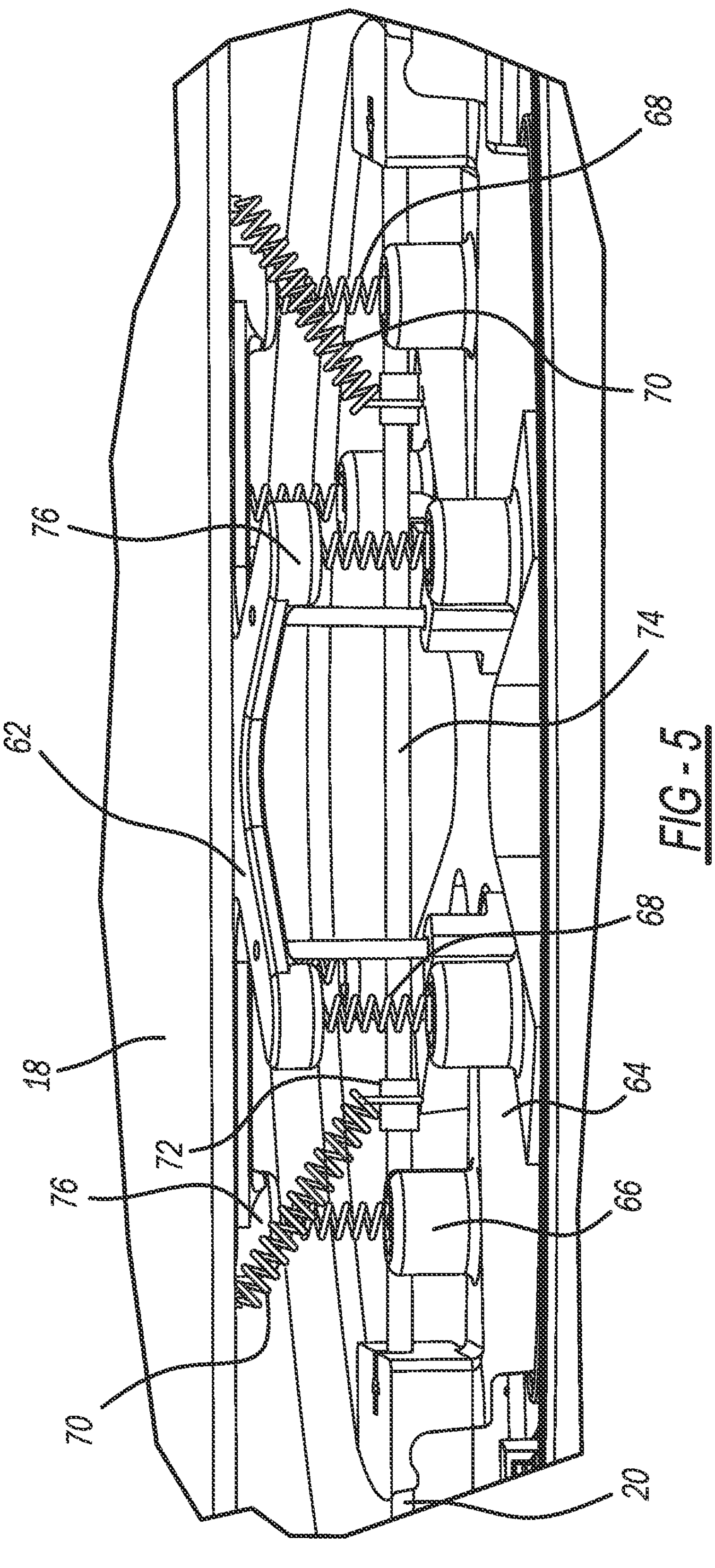
FIG. 5 is a top plan view of the door of FIG. 4.
Figure 6:
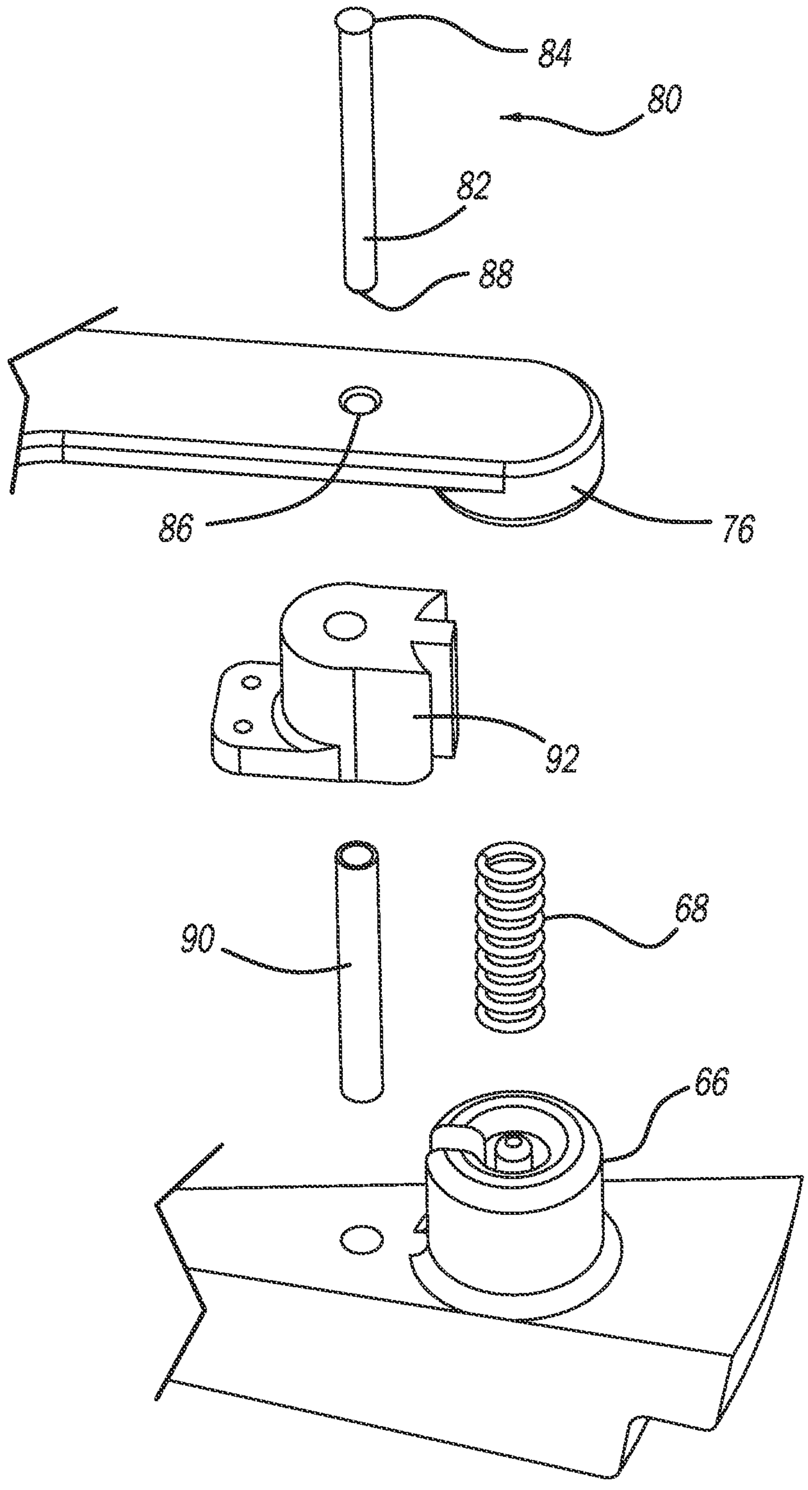
FIG. 6 is an exploded perspective view of the door of FIG. 4.

Turning to FIGS. 4-6, another door suspension assembly 60 is illustrated. The suspension assembly 60 includes a sliding plate 62 attached to the inner door 20 by springs 68 and a plate 64 that is secured to the inner door 20. The plate 64 has a design that mirrors the sliding plate 62. The plate 64 includes a plurality of retention members 66 that secure the springs 68 between the plate 64 and sliding plate 62. Springs 70 are secured to the outer door 18 and rod 74. In particular, the springs 70 are attached to bushings 72 that are secured to the rod 74 and the rod 74 is secured to the inner door 20 and plate 64. The retention members 66 receive the ends of the springs 68 and the sliding plate 62 has a hub with a plurality of spokes that include the retaining members 76 that receive the other ends of the springs 68.

In use, the inner door 20 floats with respect to the outer door 18. The springs 68, 70 enable the floating of the inner door 20. When the inner door 20 is secured with the drum and tub assembly 14 in a closed position, the inner door 20 is permitted to slide vertically up and down as well as laterally side to side because the inner door 20 is not fixably mounted to the drum and tub assembly 14, but instead is suspended by springs 68, 70. During this motion, the sliding plate 62 will slide relative to the inner surface of the outer door 18, which is shown as a door fragment in FIG. 4. The inner door 20 is also permitted to move towards or away from the outer door 18. The inner door 20 will move in this way to match the motion of the drum and tub assembly 14, to which it is secured. The freedom to move laterally and vertically also is present while the inner door 20 is swung closed. Thus, as the hook 32 on the inner door 20 is secured with the drum and tub assembly 14, the inner door 20 easily slides laterally and vertically with respect to the outer door 18. Thus, this compensates for the off-center positioning of the inner door 20 with respect to the outer door 18 as well as alignment of the inner door 20 with the drum and tub assembly 14.

Accordingly, the inner door 20 is positioned off center with respect to the outer door 18. Thus, as the inner and outer doors 18, 20 close and the hook 32 catches the hook receiver 120, the floating inner door 20 needs to slide relative to the inside face of the outer door 18. Thus, the sliding plate 62 enables this to occur so that as the inner door 20 is secure to the drum and tub assembly 14, the inner door 20 slides with respect to the outer door 18. When this occurs, the springs 70 do not buckle and the inner door 20 is easily moved laterally. Also, during washing, the drum and tub assembly 14 bounces around inside the cabinet 12. Thus, the inner door 20 is able to move relative to the outer door 18 to accommodate this bouncing.

As shown in FIGS. 5 and 6, alignment pins 80 are positioned between the inner door 20 and outer door 18. The alignment pins 80 include a shaft 82 with a mushroom head 84 that fits into a countersink hole 86 in the sliding plate 62 and an outer end 88 that is positioned in a boss 92 which includes a sleeve 90. As the inner door 20 moves with respect to the outer door 18, the inner door 20 can still rotate a few degrees acting as a ball joint with the mushroom head 84 positioned in the countersink hole 86. The outer end 88 of the shaft 82 is slightly chamfered and slides in the sleeve 90 of the boss 92 acting as a linear bushing. Two alignment pins 80 are illustrated and positioned at the top section of the inner door 20. Due to the door bowl design, this is the deepest part of the inner door 20 and allows for the most motion. Thus, the alignment pins 80 enables twisting forces on the inner door 20 to be transferred to the sliding plate 62.

Figure 7:
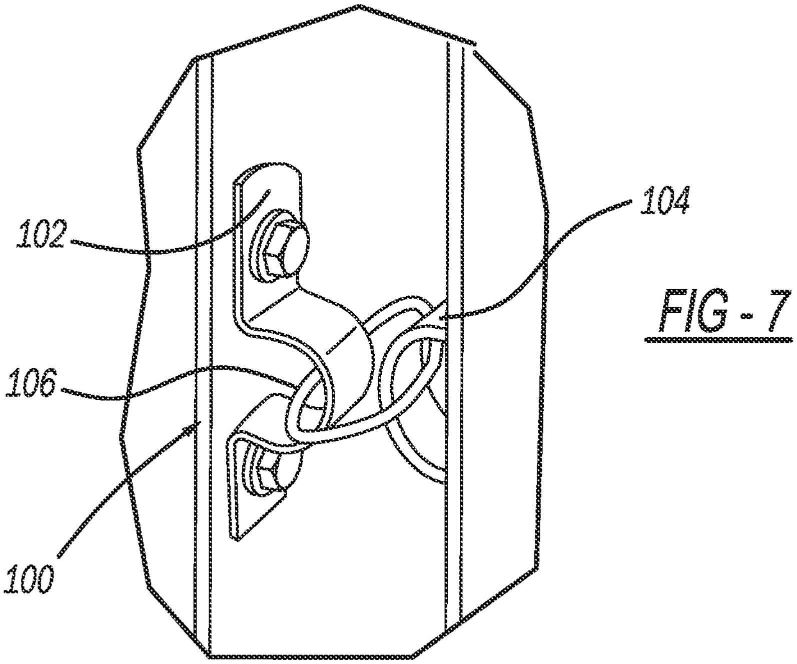
FIG. 7 is a perspective view of a door in accordance with the disclosure.

Turning to FIG. 7, the door assembly 16 may include a motion limiter 100. The motion limiter 100 is secured between the outer door 18 and inner door 20. The motion limiter 100 may include brackets 102, 104 enabling a coupling device 106 to be positioned between the two. The coupling device 106 may be a flexible or rigid link, tether, or the like that enables play between the inner and outer doors 18, 20. Thus, the coupling device 106 prevents too much motion when opening the inner and outer doors 18, 20 but allows smaller movements of the inner door 20 relative to the outer door 18 during the wash cycle. Additionally or alternatively, a link with balls on both ends could be positioned into joints so that the outer and inner doors 18, 20 can move or articulate with respect to one another.

Figure 8:
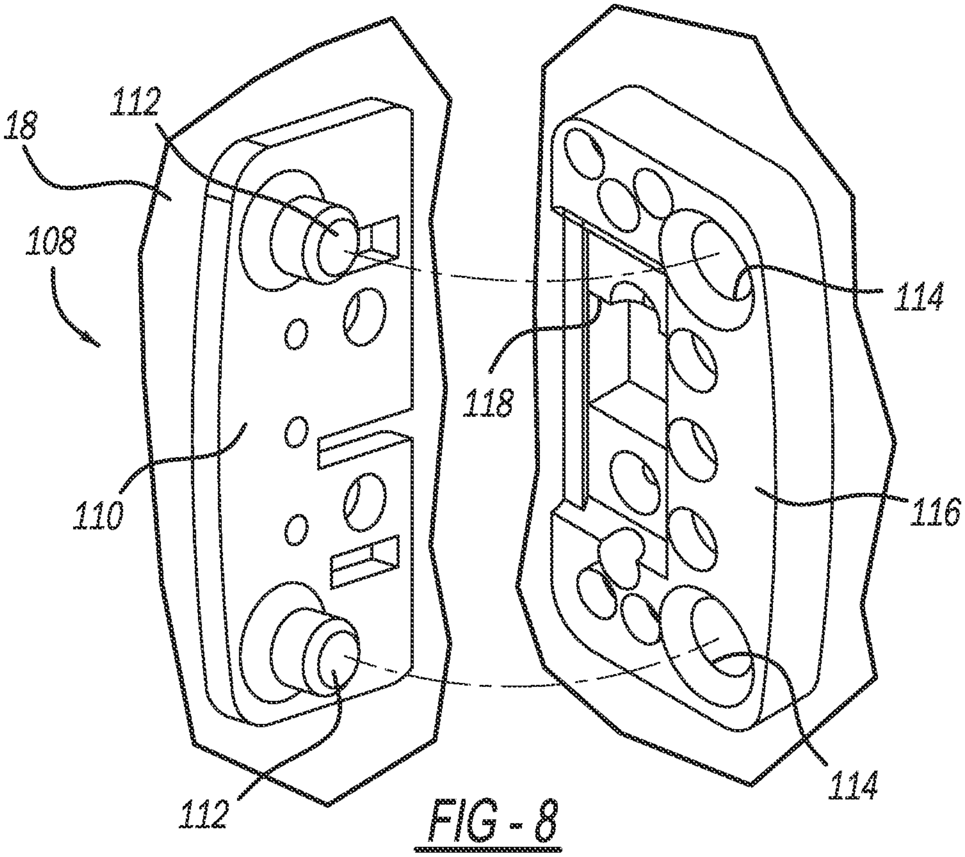
FIG. 8 is a perspective view of an alignment member on the door in accordance with the disclosure.

FIG. 8 illustrates an alignment feature 108 for the door assembly 16. The alignment feature 108 includes a first plate 110 that is secured to the inner door 20 and has a pair of alignment nubs 112. The nubs 112 are received in countersink apertures 114 in a second plate 116. The second plate 116 is secured to the drum and tub assembly 14. The second plate 116 also includes an aperture 118 to receive the door latch 34. When the nubs 112 are positioned in the countersink apertures 114 and the inner door 20 is closed, the nubs 112 support the weight of the inner door 20. This prevents up and down as well as side to side forces from being transferred to the door latch 34. The nubs 112 also enhance the alignment of the door latch 34 when it enters the apertures 118 so that the nubs 112 are positioned into the countersink apertures 114.

Figure 9:
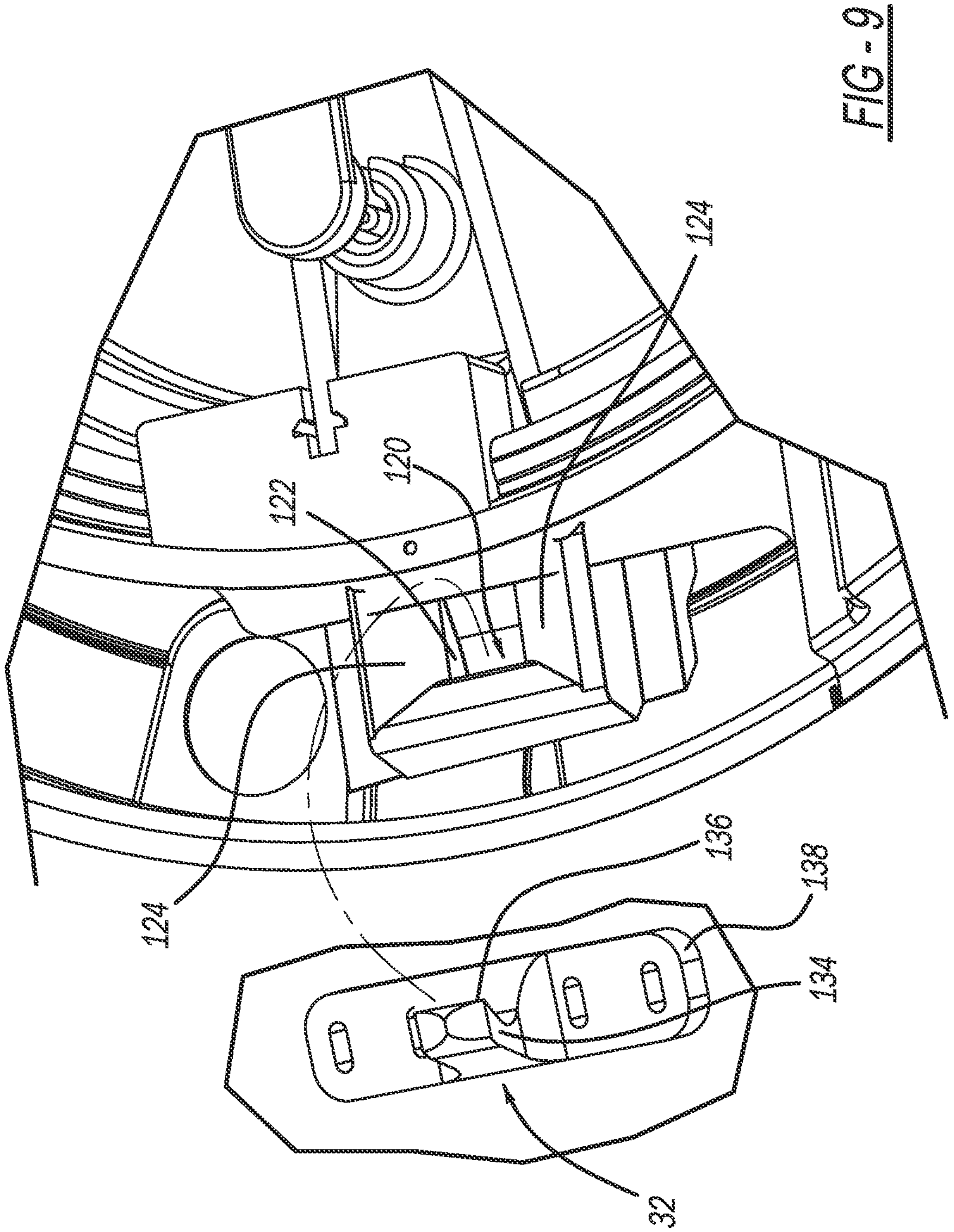
FIG. 9 is a perspective view of an alignment hook in accordance with the present disclosure.

FIG. 9 illustrates the hook 32 and the hook receiver 120. The hook 32 includes a shaft portion 134 and a hook portion 136 that extend from base plate 138. The hook portion 136 is angled at approximately 45° with respect to the shaft portion 134. This enhances insertion into the hook receiver 120. The hook receiver 120 includes an aperture 122 and ramps 124. The aperture 122 receives the hook 32 when the inner door 20 closes against the drum and tub assembly 14. The ramps 124 provide a chamfer to enable the hook 32 to more readily enter the aperture 122. The hook 32 hits the ramps 124 and is guided into the aperture 122. Thus, the ramps 124 account for a range of vertical and horizontal displacement of the drum and tub assembly 14. This could happen, for example, when wet towels or the like are within the drum and tub assembly 14 and there is a height disparity between the hook 32 and the hook receiver 120.

Figure 10:
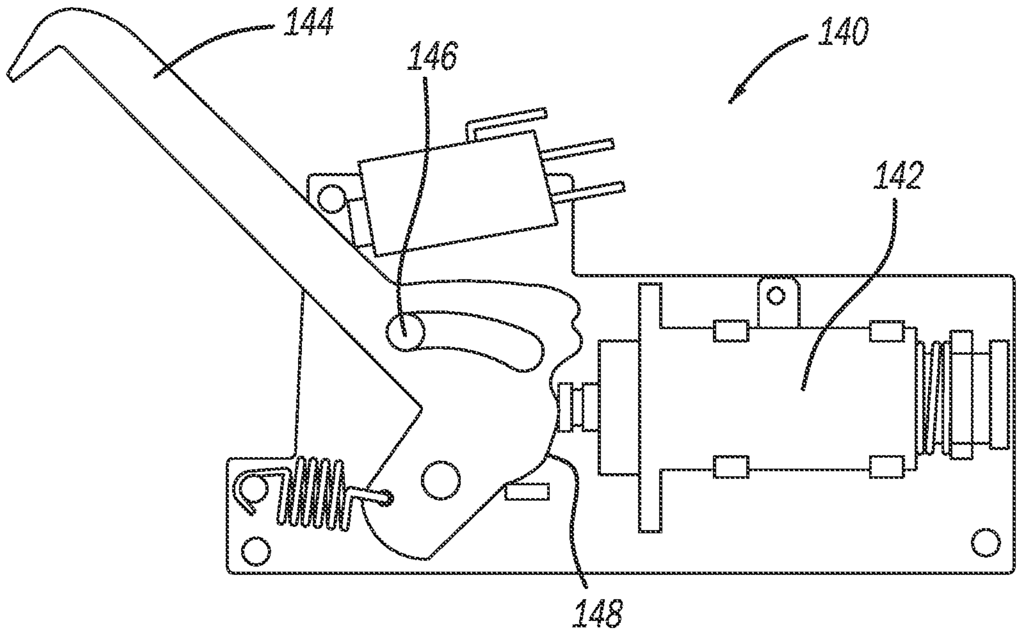
FIG. 10 is a latching device of the door according to the disclosure.

Turning to FIG. 10, a latching device 140 is illustrated. When the inner door 20 does not perfectly align with the door latch 34, the inner door 20 can be pulled toward the door latch 34 so that a complete closing can be accomplished between the door latch 34 and the inner door 20. The latching device 140 in FIG. 10 has an electronic switch 142 for moving a hook 144. As the hook 144 is moved, it slides along a pin 146. As the hook 144 couples with the door latch 34, the opposite end of the hook 144 rides along cam surface 148, which pulls the inner door 20 into position relative to the tub and drum assembly 14.

Figure 11:
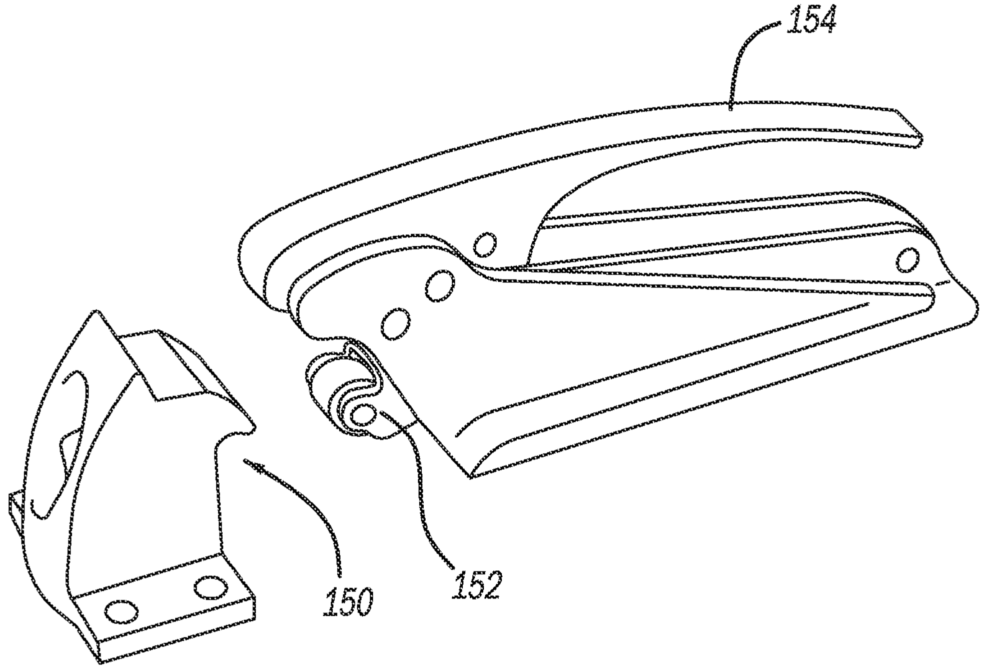
FIG. 11 is a perspective view of a latching device in accordance with the disclosure.

FIG. 11 illustrates a manual configuration wherein a fixed latch 150 is caught by hook 152 and then handle 154 is moved into a locking position, which draws the handle 154 and inner door 20 toward the fixed latch 150.

Turning to FIGS. 12A-12D, an alignment device 160 is illustrated. The alignment device 160 includes a finger 168 that is located inside of the outer door 18. The finger 168 pushes the floating inner door 20 sidewise laterally, assisting in the hook 32 and hook receiver 120 lining up.

Figure 12A:
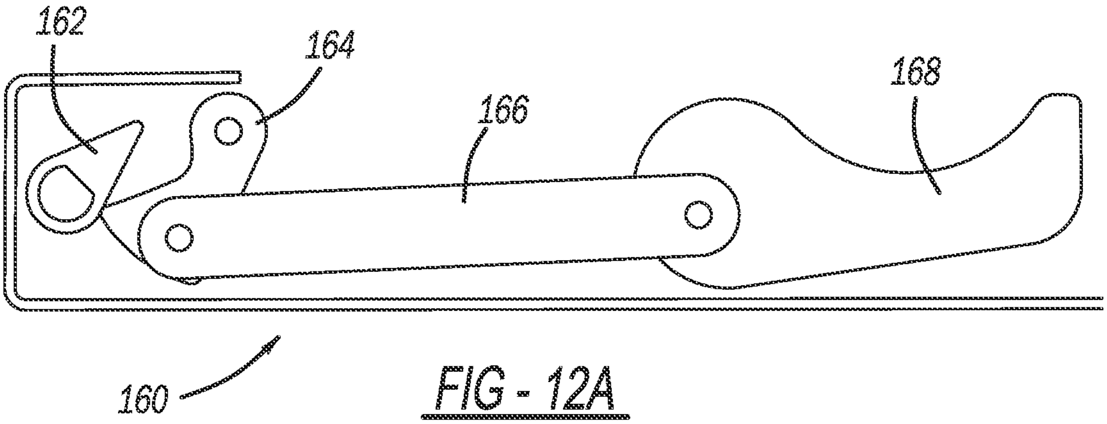
Figure 12B:
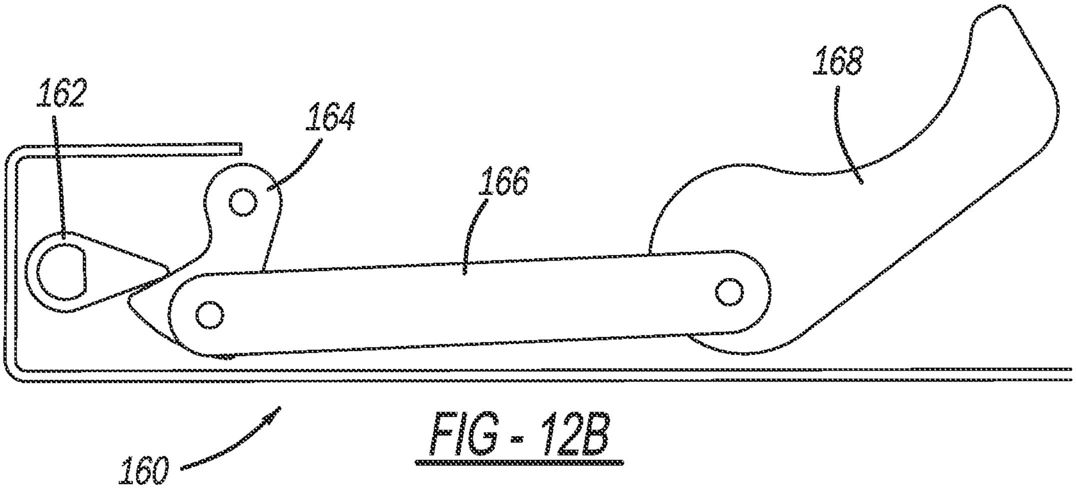
Figure 12C:
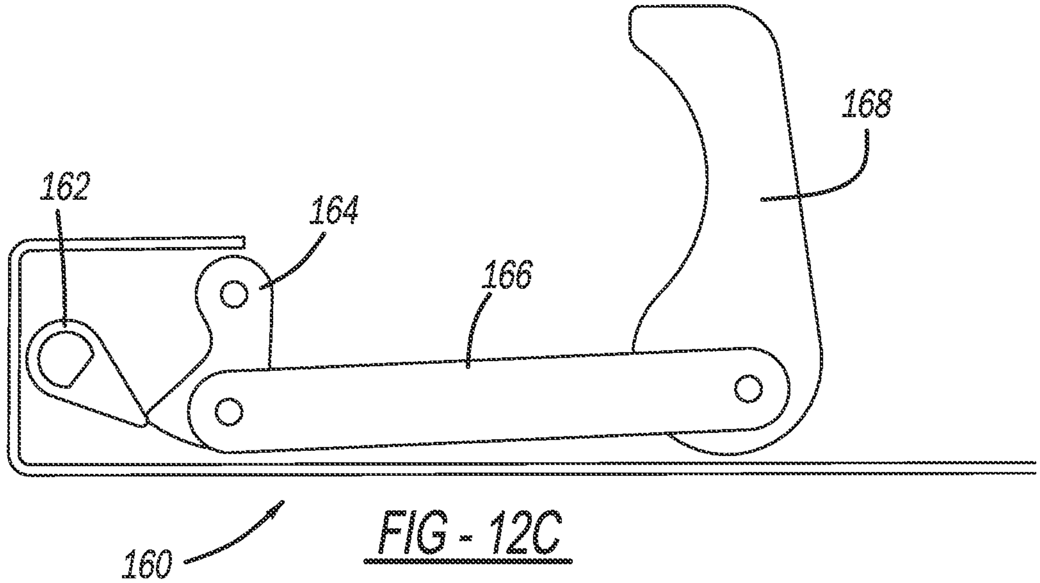
Figure 12D:
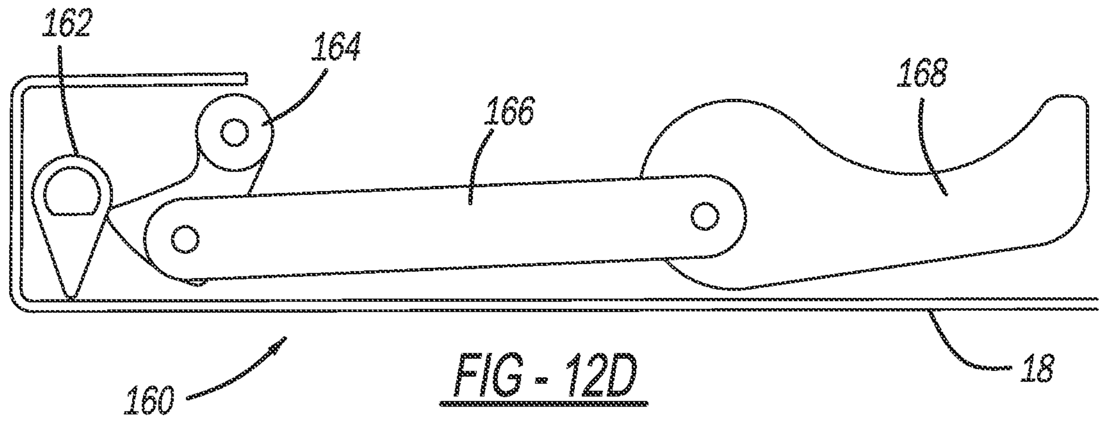
Figure 13A:
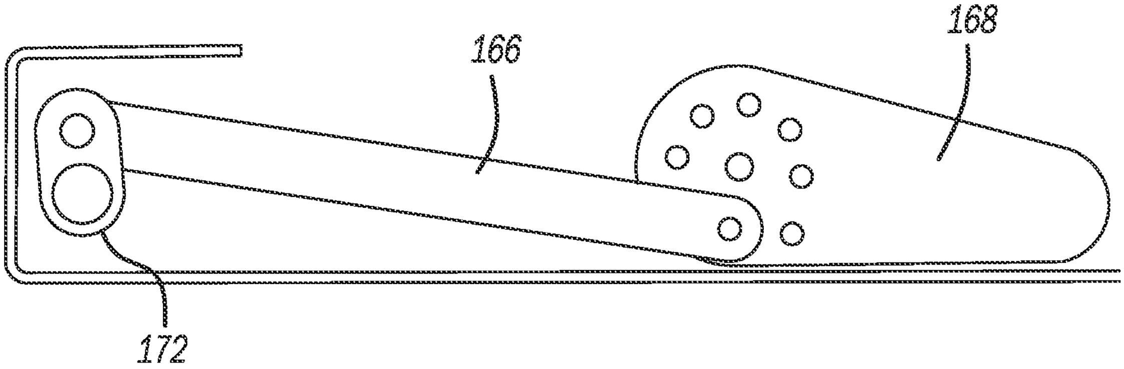
Figure 13B:
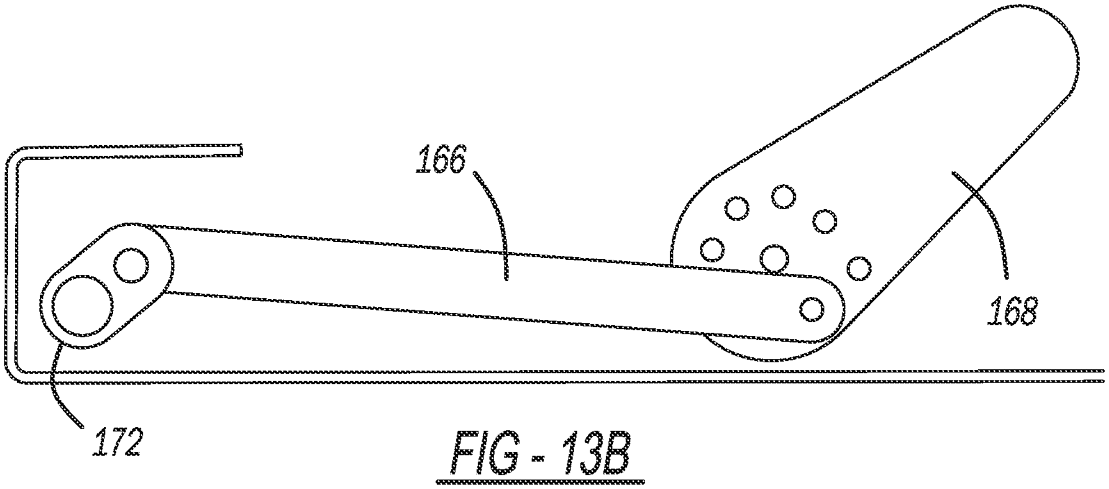
Figure 13C:
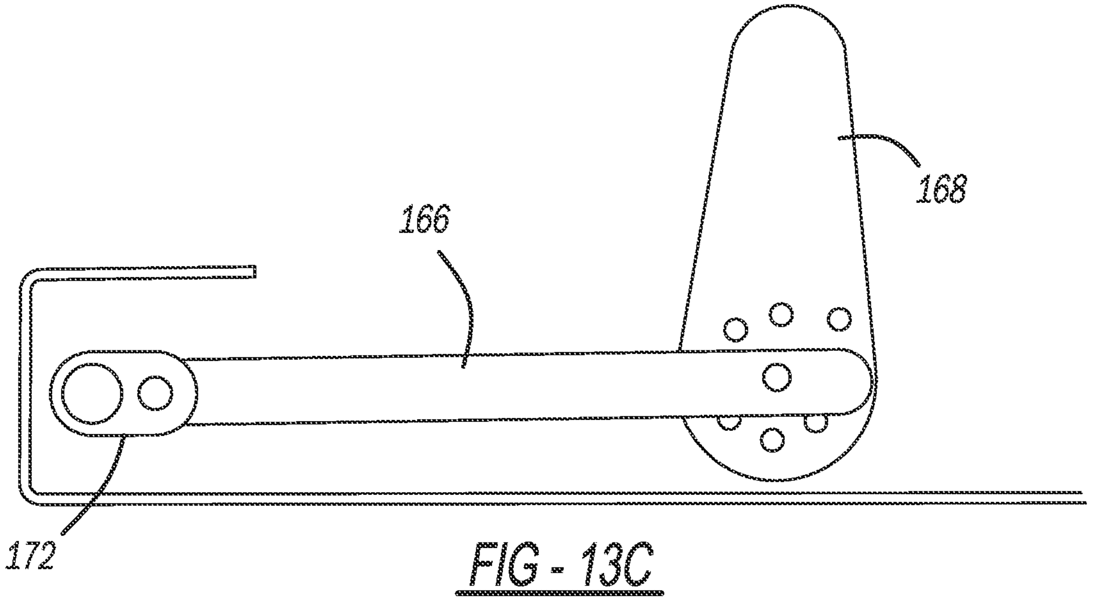
Figure 13D:
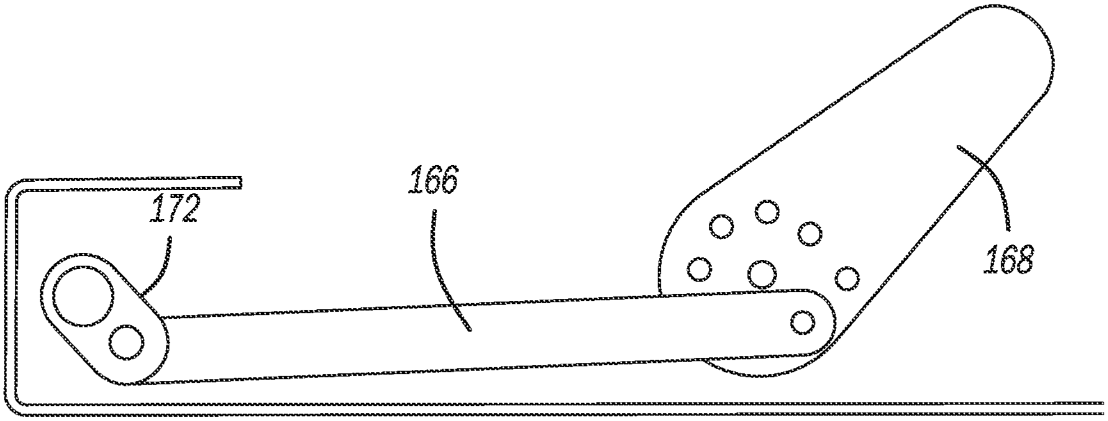
Figure 13E:
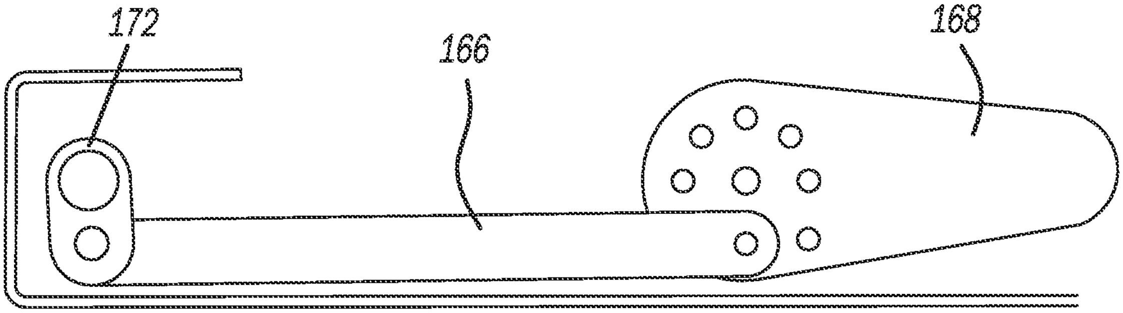

In FIGS. 12A-12D, the alignment device 160 includes a rotating cam 162 positioned against a pinned cam follower 164. The cam follower 164 is coupled with a bar linkage 166 and the finger 168 is pinned to the other end of the bar linkage 166. As the outer door 18 is in an open position, as in FIG. 12A, the finger 168 is within the outer door 18. As the outer door 18 is closed, the rotating cam 162 rotates against the cam follower 164. As this occurs, the bar linkage 166 moves laterally extending the finger 168 out of the rear surface of the outer door 18 and pushes against the inner door 20. As the outer door 18 continues to close, the finger 168 continues to rotates away from the outer door 18 as illustrated in FIG. 12C. Finally, when the outer door 18 is closed, as shown in FIG. 12D, the finger 168 rotates back within the outer door 18.

FIGS. 13A-13E illustrate an alignment device 160 where the bar linkage 166 and finger 168 are coupled with a cam arm 172. As the outer door 18 is closed, the cam arm 172 moves as illustrated in FIGS. 13A-13E. As the outer door 18 is closed, the finger 168 is perpendicular to the outer door 18. As the outer door 18 is closed, the finger 168 is retracted into the outer door 18 to enable the inner door 20 to be moved closer with respect to the outer door 18.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A combination washer/dryer, comprising:

a cabinet having an opening enabling access inside the cabinet;

a drum and tub assembly positioned within the cabinet;

a washing circuit for washing items in the drum and tub assembly;

a drying circuit for drying the items in the drum and tub assembly; and a door assembly including an outer door and a floating inner door that seals against the drum and tub assembly in a closed position;

a door latch on the inner door that engages an inner door catch on the drum and tub assembly, the door latch including a hook configured to pull on the inner door catch and pull the inner door to the closed position; and a door suspension assembly that couples the floating inner door to the outer door while still permitting the floating inner door to move relative to the outer door, wherein the tub and drum assembly includes a hook receiver with an aperture and the inner door includes a hook that enters the aperture of the hook receiver as the inner door closes against the drum and tub assembly.

2. The combination washer/dryer of claim 1, wherein the door suspension assembly includes a pivot enabling the inner door to teeter with respect to the outer door.

3. The combination washer/dryer of claim 1, wherein the inner door hangs off center of the outer door in an open position.

4. The combination washer/dryer of claim 1, wherein the suspension includes a plate mounted on the inner door and one or more springs coupled with the plate and outer door so that the plate is free to slide with respect to the outer door to enhance engagement of the hook with the drum and tub assembly.

5. The combination washer/dryer of claim 4, wherein the door suspension assembly further includes one or more alignment pins coupled between the plate and the outer door to compensate for twisting forces on the inner door and to transfer the twisting forces to the plate.

6. The combination washer/dryer of claim 1, further comprising: an alignment member on the inner door for supporting the weight of the inner door and prohibiting lateral and longitudinal forces from being applied to the door latch.

7. The combination washer/dryer of claim 1, wherein the hook receiver includes an aperture and one or more ramps adjacent to the aperture for guiding the hook into the aperture to compensate for misalignment.

8. The combination washer/dryer of claim 1, further comprising a motion limiter for prohibiting undue motion when opening the outer door while enabling motion of the inner door during a wash cycle or drying cycle.

9. The combination washer/dryer of claim 1, further comprising an alignment device coupled with the outer door for positioning the inner door for enhancing coupling of the inner door with the drum and tub assembly.

10. The combination washer/dryer of claim 9, wherein the alignment device includes a rotating cam coupled with a bar linkage coupled with a finger that is configured to move the inner door.

11. The combination washer/dryer of claim 1, wherein the door latch includes a handle that actuates the hook of the door latch.

12. A door assembly for a washer or combination washer/dryer, comprising:

an outer door and a floating inner door for sealing a drum and tub assembly;

a door latch on the inner door that engages an inner door catch on the drum and tub assembly; and an alignment member on the inner door for supporting the weight of the inner door and prohibiting lateral and longitudinal forces from being applied to the door latch, wherein the inner door includes a hook and the drum and tub assembly includes a hook receiver, the hook receiver including an aperture and one or more ramps adjacent the aperture for leading the hook into the aperture to compensate for misalignment.

13. The door assembly of claim 12, further comprising a door suspension assembly suspending the inner door from the outer door.

14. A door assembly for a washer or combination washer/dryer, comprising:

an outer door and a floating inner door for sealing a drum and tub assembly, a motion limiter for prohibiting undue motion when opening the outer door while enabling motion of the inner door during a wash cycle or drying cycle.

15. The door assembly of claim 14, further comprising a door latch on the inner door that engages an inner door catch on the drum and tub assembly, the door latch including a hook configured to pull on the inner door catch and pull the inner door to a closed position.

16. The door assembly of claim 15, further comprising:

an alignment member on the inner door for supporting the weight of the inner door and prohibiting lateral and longitudinal forces from being applied to the door latch.

17. The door assembly of claim 14, further comprising a door suspension assembly suspending the inner door from the outer door.

18. The door assembly of claim 14, wherein the inner door includes a hook and the drum and tub assembly includes a hook receiver, the hook receiver including an aperture and one or more ramps adjacent the aperture for leading the hook into the aperture to compensate for misalignment.

* * * * *